Nov. 5, 1935.  C. S. ASH  2,019,556

WHEEL

Filed Jan. 8, 1935

INVENTOR
CHARLES S. ASH.
BY *Whittemore Hulbert*
*Whittemore & Belknap*

ATTORNEY

Patented Nov. 5, 1935

2,019,556

UNITED STATES PATENT OFFICE 2,019,556

WHEEL

Charles S. Ash, Milford, Mich., assignor to Kelsey-Hayes Wheel Company, Detroit, Mich., a corporation of Delaware Application January 8, 1935, Serial No. 919

4 Claims. (Cl. 301—5)

The invention relates to wheels and refers more particularly to wheels for use with motor vehicles.

The invention has for one of its objects to provide a wheel construction having a wheel assembly and a cover and to provide means upon the cover for counterbalancing the unbalancing weight of the wheel assembly to secure a wheel construction having perfect running balance. The invention has for another object to so construct the counterbalancing weight that it may be readily varied and to so mount this weight that it is concealed by the cover. A further object is to provide access to the counterbalancing weight by detachably securing the cover to the wheel assembly.

Figure 2:
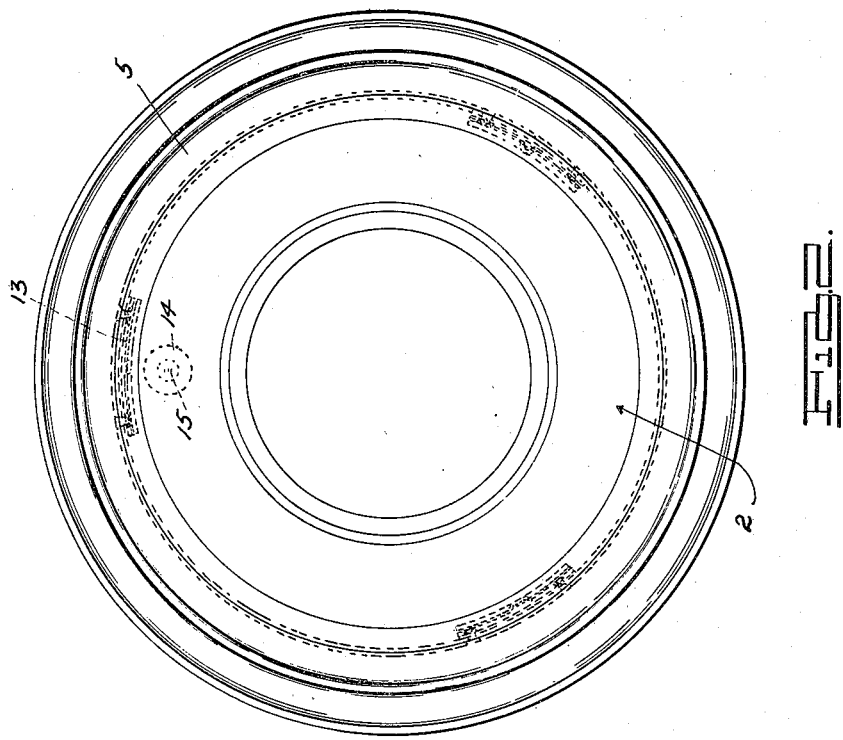
Figure 1:
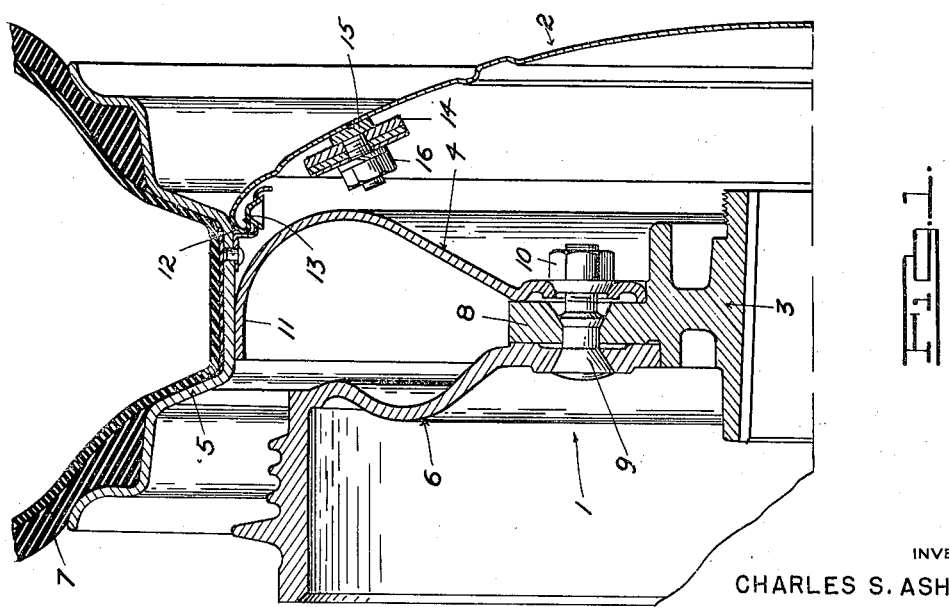

These and other objects of the invention will become apparent from the following description, taken in connection with the accompanying drawing, in which Figure 1 is a front elevation of a wheel construction showing an embodiment of my invention;

Figure 2 is a cross section on the line 2—2 of Figure 1.

As illustrated in the present instance, the wheel construction or complete wheel comprises the wheel assembly 1 and the cover plate 2. The wheel assembly comprises the wheel hub 3, the wheel body 4, the tire carrying rim 5 and the brake drum 6. It is also intended that the wheel assembly may comprise the tire 7. The wheel hub has a fixed radially extending flange 8 to the inboard side of which is fixedly secured the web of the brake drum 6 and to the outboard side of which is detachably secured the wheel body 4. The wheel body, as shown, is of the disk type and it is detachably secured to the wheel hub by the bolts 9 and the nuts 10. The rim 5, as shown, is of the drop-center type having its base fixedly secured to the peripheral flange 11 upon the wheel body. The cover plate is adapted to conceal the wheel body, the wheel hub and the means for securing the wheel body to the wheel hub and for securing the wheel hub to the axle. The cover plate is preferably formed of sheet metal and has the peripheral bead 12 which is detachably engaged with the peripherally spaced resilient detents 13 secured to the inner face of the rim well.

The wheel assembly is usually unbalanced in that its weight at one side of its axis is usually greater than at another side. This may be caused by the wheel hub, the wheel body, the rim, the brake drum or the tire being unbalanced, or by a combination. Since it is very important, especially when the tire is a low pressure tire, to have the wheel construction or complete wheel in perfect running balance, I have provided means upon and concealed by the cover plate 2 for counterbalancing the wheel assembly. This counterbalancing weight, as shown, comprises the member 14, the stud 15 and the nut 16 threaded upon the stud. The member 14 may comprise one or more plates which are sleeved upon the stud and which are adapted to be clamped against its base by the nut 16 and the base is fixedly secured to the inboard side of the cover by suitable means, such as welding. The counterbalancing weight is opposed to the unbalancing weight of the wheel assembly, the cover plate being angularly adjustably secured to the wheel assembly. This counterbalancing weight may be readily varied by removing or adding plates which are provided with different thicknesses until the wheel construction or complete wheel is in perfect running balance. It is apparent that this arrangement also provides for readily counterbalancing the wheel construction in the event that any element such as the tire or the brake drum is replaced by another in another state of balance or unbalance.

What I claim as my invention is:

1. The combination of an unbalanced wheel assembly, a cover plate secured thereto, and means upon said cover plate for counterbalancing the unbalancing weight of said assembly.

2. The combination of a wheel assembly having a weight greater at one side of its axis than another causing unbalancing of the assembly, a cover plate secured to said assembly, and means upon said cover plate for counterbalancing said unbalancing weight.

3. The combination of an unbalanced wheel assembly, a predeterminedly unbalanced cover plate, and means for securing said cover plate to said assembly to oppose the unbalancing weight of one to the unbalancing weight of the other.

4. The combination of an unbalanced wheel assembly, a cover plate, a weight for counterbalancing the unbalancing weight of said assembly, said counterbalancing weight comprising a member at the inboard side of said cover plate, and means also at the inboard side of said cover plate for detachably securing said member to said cover and means for detachably securing said cover to said assembly.

CHARLES S. ASH.